(12) United States Patent
Huff et al.

(10) Patent No.: US 6,185,670 B1
(45) Date of Patent: Feb. 6, 2001

(54) SYSTEM FOR REDUCING NUMBER OF OPCODES REQUIRED IN A PROCESSOR USING AN INSTRUCTION FORMAT INCLUDING OPERATION CLASS CODE AND OPERATION SELECTOR CODE FIELDS

(75) Inventors: Thomas R. Huff; Shreekant S. Thakkar, both of Portland; Roger A. Golliver, Beaverton, all of OR (US)

(73) Assignee: Intel Corporation, Santa Clara, CA (US)

( * ) Notice: Under 35 U.S.C. 154(b), the term of this patent shall be extended for 0 days.

(21) Appl. No.: 09/170,136

(22) Filed: Oct. 12, 1998

(51) Int. Cl.$^7$ .................................................. G06F 15/00
(52) U.S. Cl. ........................ 712/208; 712/32; 712/209; 708/209
(58) Field of Search .......................... 712/32, 288, 209, 712/240; 708/209

(56) References Cited

U.S. PATENT DOCUMENTS

| | | | | |
|---|---|---|---|---|
| 5,136,696 | * | 8/1992 | Beckwith et al. | 712/240 |
| 5,442,576 | * | 8/1995 | Gergen et al. | 708/209 |
| 5,459,845 | * | 10/1995 | Nguyen et al. | 712/248 |
| 5,463,746 | | 10/1995 | Brodnax et al. | 395/375 |
| 5,636,352 | * | 6/1997 | Bealkowski et al. | 712/208 |
| 5,659,722 | | 8/1997 | Blaner et al. | 395/581 |
| 5,784,585 | * | 7/1998 | Denman | 712/209 |
| 6,036,350 | * | 3/2000 | Mennemeier et al. | 364/715.012 |
| 6,049,862 | * | 4/2000 | Bauer et al. | 712/208 |

* cited by examiner

Primary Examiner—Meng-Ai T. An
Assistant Examiner—Nabil El-Hady
(74) Attorney, Agent, or Firm—Blakely, Sokoloff, Taylor & Zafman LLP

(57) ABSTRACT

A method and apparatus for reducing the number of opcodes required in a computer architecture using an operation class code and an operation selector code. A processor contains a fetch unit which fetches instructions to be executed by the processor. An instruction may conform to an instruction format which includes a number of fields that specify an operation class code, an operation selector code, and one or more operands. The processor also contains a decoder which uses the operation class code to generate a single execution flow that is capable of executing a class of similar operations. The single execution flow, in the form of execution control information, is sent to an execution unit along with the associated operands. The operation selector code is also passed to the execution unit. The execution unit performs the specific operation identified by the operation selector code and execution control information.

21 Claims, 4 Drawing Sheets

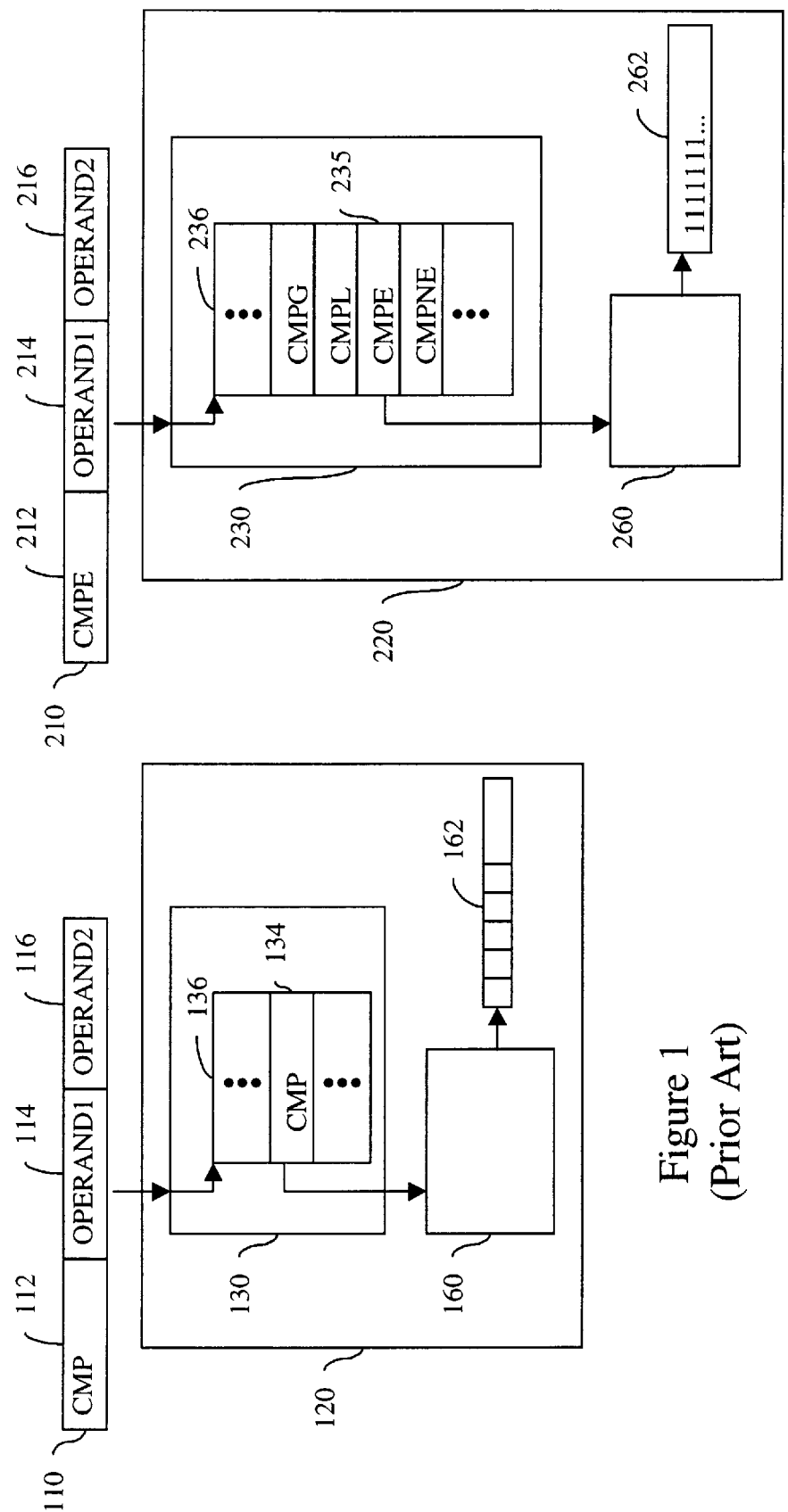

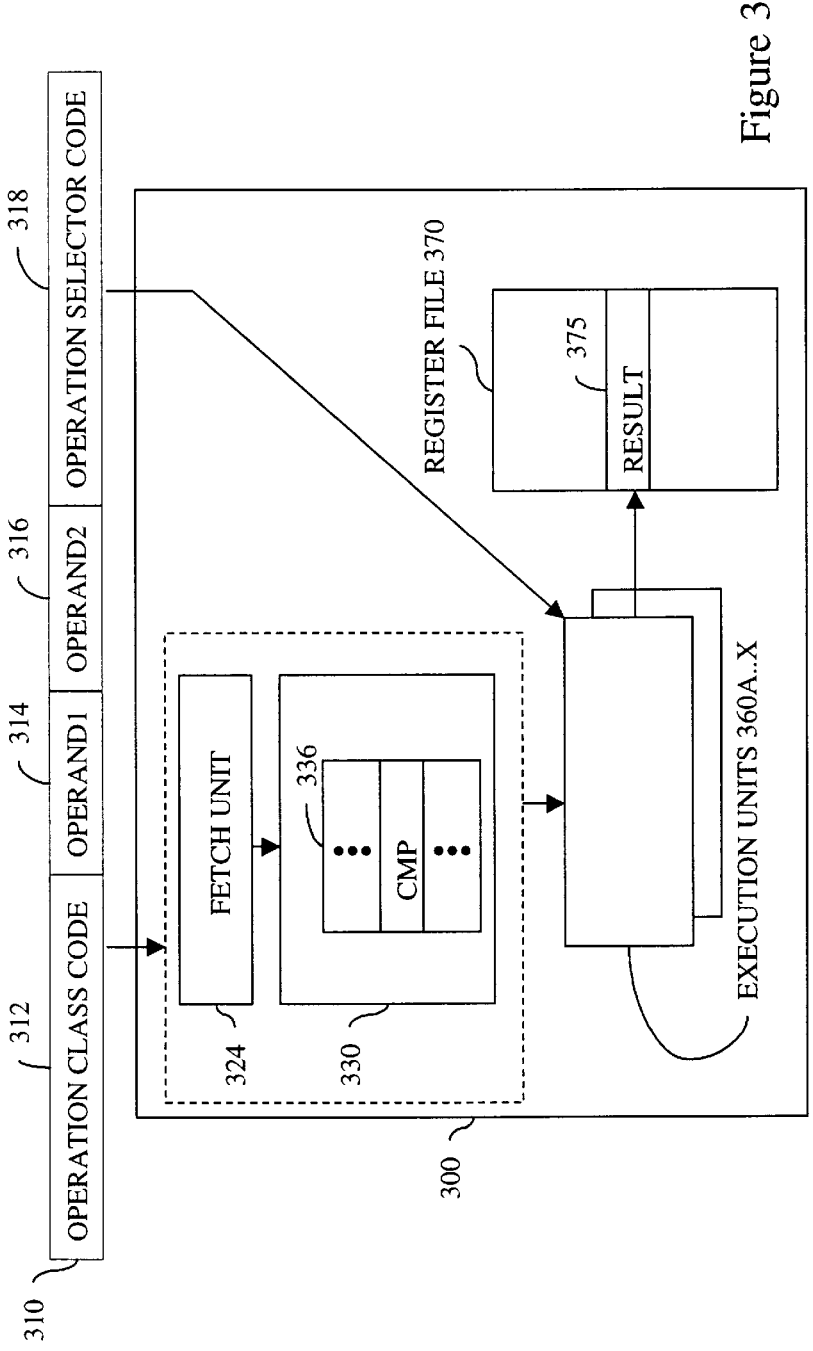
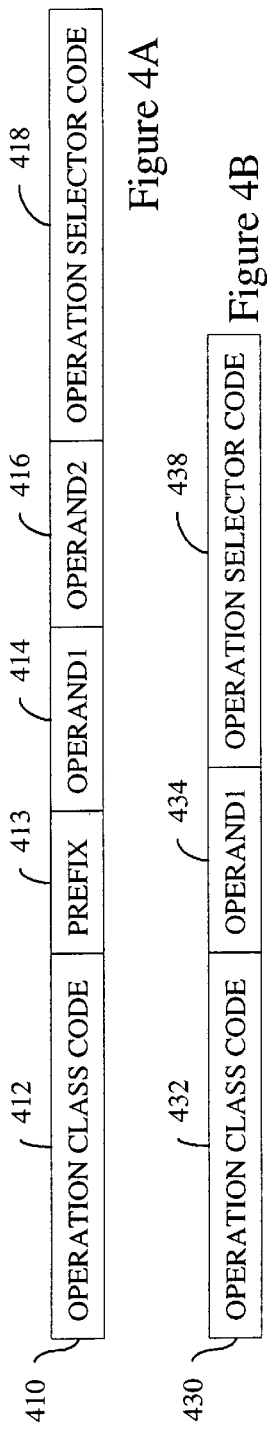

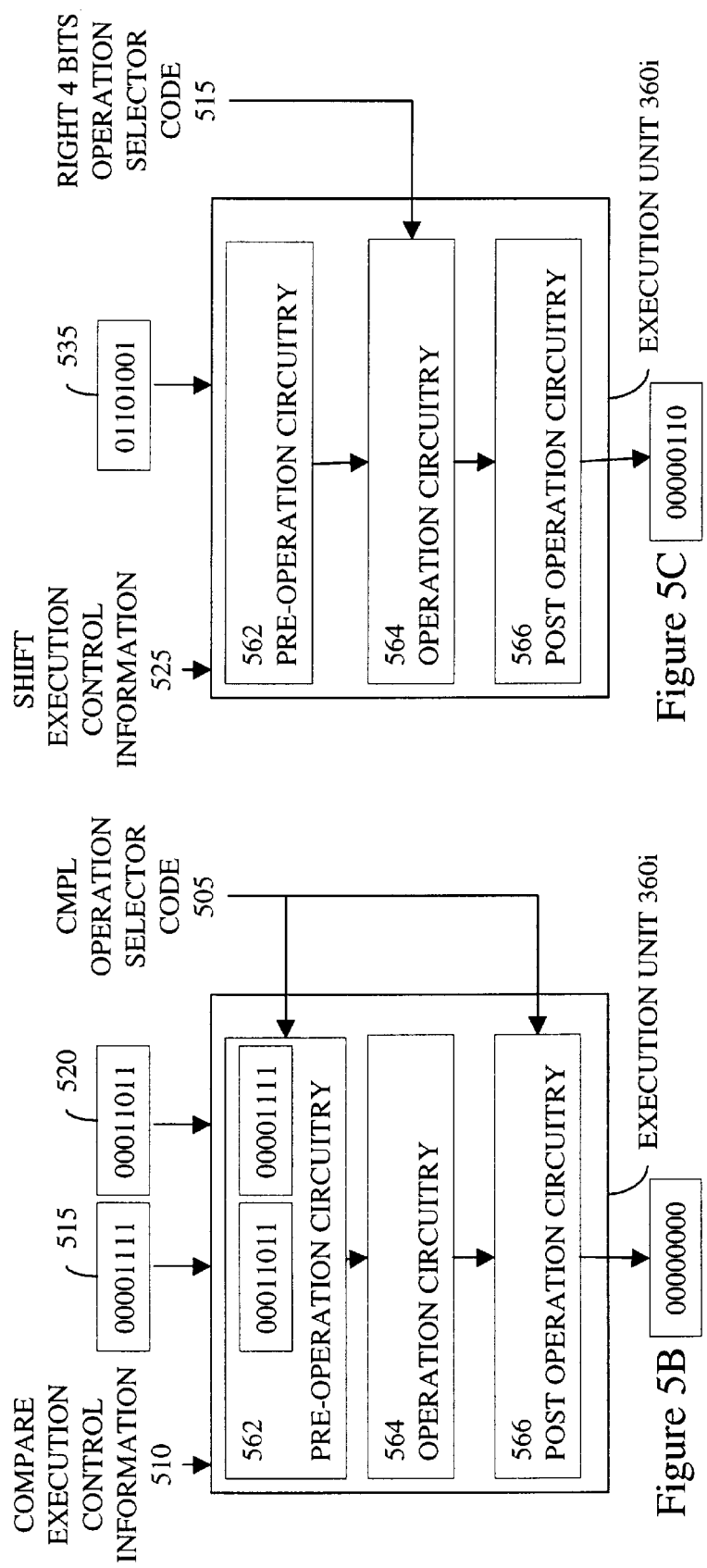

SYSTEM FOR REDUCING NUMBER OF OPCODES REQUIRED IN A PROCESSOR USING AN INSTRUCTION FORMAT INCLUDING OPERATION CLASS CODE AND OPERATION SELECTOR CODE FIELDS

FIELD OF THE INVENTION

This invention relates to the field of computer processor architectures.

BACKGROUND

After an instruction enters the processor, it is passed to an instruction decoder. The instruction decoder reads the opcode field from the instruction and determines how the processor will execute the associated operation. In particular, the decoder decodes the instruction into execution control information, such as discrete control signals, microcode fetched from a data store, a combination of the two, or control information appropriate to other well known methods. The execution control information represents an execution flow which controls, in part, the operation of one or more different execution units to perform the operation specified by the instruction.

By way of example, FIG. 1 is a block diagram illustrating a prior art implementation of a processor 120 supporting a class of comparison operations using a single compare instruction 110. The compare instruction is received by the processor 120 and is provided to an instruction decoder 130. The instruction decoder 130 selects a compare microcode 134, which will cause the full range of comparison relationships to be performed, from a microcode table 136 and sends it to an execution unit 160. The execution unit 160 performs the full range of comparisons and sets a number of bits in a result register 162 with each bit corresponding to a different comparison condition. These bit combinations are then interpreted by other instructions to check for the desired condition.

In another example, FIG. 2 is a block diagram illustrating a prior art implementation of a processor supporting a class of comparison operations using a separate instruction for each comparison relationship. By way of example, FIG. 2 shows a compare-equal instruction 210 entering an instruction decoder 230 of a processor 220. Inside the instruction decoder 230, the compare-equal opcode 212 is used to pull the compare-equal microcode 235 from the microcode table 236. The compare-equal microcode causes an execution unit 260 to perform the compare-equal operation and store in a result register 262 either of all-1s or all-0s depending on the equality of the operands identified in the first operand field 214 and the second operand field 216. Because the execution unit produces the "all or nothing" result, each type of comparison relationship has a separate opcode in the decoder as shown in the microcode table 236. As such, the processor of FIG. 2 supports a separate instruction for each of the following comparison operations: compare-greater-than (CMPGT), compare-less-than (CMPLT), compare-equal (CMPE), compare-not-equal (CMPNE), compare-greater-than-or-equal (CMPGTE), and compare-less-than-or-equal (CMPLTE).

While the processor in FIG. 1 uses only one opcode space for the full range of comparisons, it has a drawback. Consider the following C source code statement:

$X=(X<0)?0:X;$ //If(X<0)then X=0 else X=X

TABLE 1

Comparison of Execution using FIGS. 1 and 2

| LOAD R1, X | ; Load R1 | LOAD R1, X | ; Load R1 |
| CMP R1, 0 | ; Set Flags | CMPGT R1, 0 | ; R1 = 0 or $2^{32}$–1 |
| BRG A | ; If > jump | AND R1, X | ; R1 = X & R1 |
| LOAD R1, 0 | ; < so zero R1 | STOR X, R1 | |
| A: STOR X, R1 | ; store back to X | | |

The left column of Table 1 shows how the processor of FIG. 1 could execute the source code statement. The compare instruction (CMP) produces a series of flags which indicate the various comparison relationships. Next, the processor must check the flags for the result of the current comparison relationship of interest (e.g., greater-than, equal-to, etc.) to determine what value should be stored back into the source register, usually by using a conditional branch instruction of some type (e.g. branch-greater-than=BRG). Such branch instructions are costly in terms of execution and can be particularly troublesome in a highly pipelined system. However, the processor from FIG. 2 (shown in the right column) uses a compare-greater-than instruction to produce a result which can be used as a mask to the next operation. The AND operation preserves the contents of X if X was greater than zero. Thus, the processor of FIG. 2 yields a more efficient execution flow at the cost of opcode space.

In modern processors, the decoder can become quite complex. Several factors influence the overall complexity of a decoder including: the available die space, the number of signal paths required, the lengths of the signal paths, the number of opcodes handled, and the complexity of the circuitry required by the individual opcodes. An increase in the number of opcodes may increase the size of the decoder and can make it more difficult (or even impossible) to route suitable signal paths to support the required throughput of a given performance specification. Therefore, it is desirable to minimize the number of opcodes required for an instruction set.

SUMMARY OF THE INVENTION

A method and apparatus for reducing the number of opcodes required in a computer architecture by using an operation class code and an operation selector code is described. According to one aspect of the invention, a processor contains a fetch unit which fetches instructions to be executed by the processor. An instruction conforming to an instruction format which includes a number of fields that specify an operation class code, an operation selector code, and one or more operands, is fetched and sent to a decoder. The decoder uses the operation class code to generate execution control information which represents a single execution flow that is capable of executing a class of similar operations. The single execution flow is sent to an execution unit along with the associated operands. In addition, the operation selector code is passed to the execution unit. The execution unit performs the one of the class of operations in the single execution flow specified by the selector code.

BRIEF DESCRIPTION OF THE DRAWINGS

The present invention is described by way of example and not by way of limitation with reference to the following figures.

FIG. 1 is a block diagram illustrating a prior art implementation of a processor supporting a class of comparison operations using a single compare instruction.

FIG. 2 is a block diagram illustrating a prior art implementation of a processor supporting a class of comparison operations using a separate instruction for each comparison relationship.

FIG. 3 is a block diagram illustrating a processor according to one embodiment of the present invention.

FIG. 4A is a block diagram illustrating an example of an instruction format according to one embodiment of the present invention.

FIG. 4B is a block diagram illustrating another example of an instruction format according to one embodiment of the present invention.

FIG. 5B is a block diagram illustrating the operation selector code altering the execution flow of a compare (CMP) operation according to one embodiment of the present invention.

FIG. 5C is a block diagram illustrating the operation selector code altering the execution flow of a bit shift (SHIFT) operation according to one embodiment of the present invention.

DETAILED DESCRIPTION OF THE PREFERRED EMBODIMENT

Figure 5A:
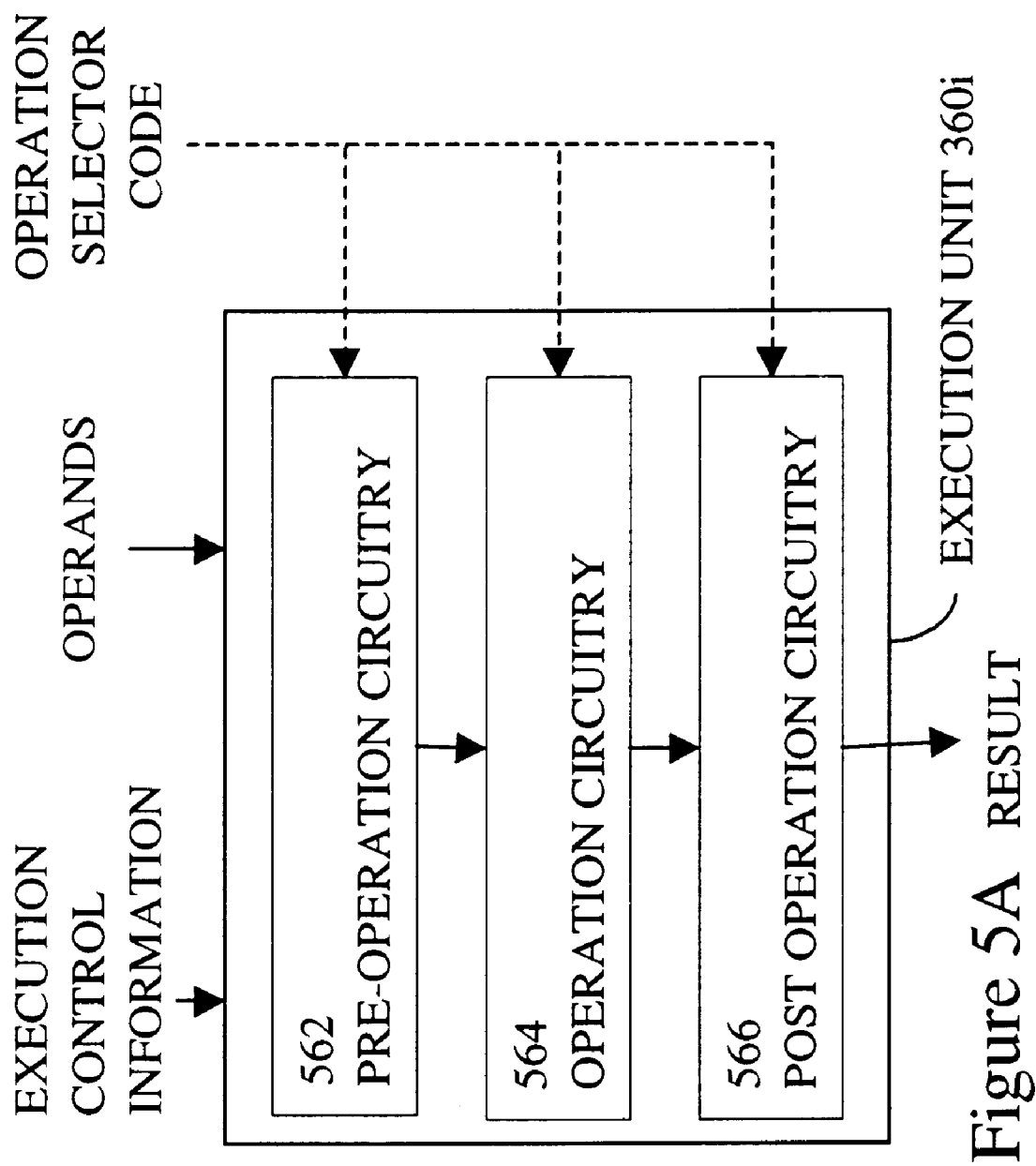
FIG. 5A is a block diagram illustrating how the data elements of an instruction ultimately arrive at an execution unit according to one embodiment of the present invention.

A method and apparatus for reducing the number of opcodes required in a computer architecture using an operation class code and an operation selector code is disclosed. In the following detailed description, numerous specific details are set forth to provide a thorough understanding of the present invention. It will be apparent to one of ordinary skill in the art that these specific details need not be used to practice the present invention. In other instances, well-known structures, interfaces, and processes have not been detailed to avoid unnecessarily obscuring the present invention.

FIG. 3 is a block diagram illustrating a processor according to one embodiment of the present invention. FIG. 3 shows an instruction format 310 composed of four fields: 1) an operation class code field containing an operation class code 311; 2) a first operand field containing a first operand descriptor 314; 3) a second operand field containing a second operand descriptor 316; and an operation selector code field containing an operation selector code descriptor 318.

The operation class code identifies a class of similar operations for which a single execution flow is provided. Depending on the implementation, different classes composed of different operations can be formed. For example, classes can include, but are not limited to, compare operations, shift operations, logical AND operations, logical OR operations, etc.

Operand descriptors identify operands. Each operand descriptor may represent an immediate value, the contents of an identified register, the contents of an identified memory location, or other well known operand type. It should also be noted that the operands are not restricted to scalar values and may be packed data types.

The operation selector code descriptor identifies an operation selector code. The operation selector code descriptor may represent an immediate value, the contents of an identified register, the contents of an identified memory location, or another well known indirect reference methodology.

The instruction 310 is fetched by a fetch unit 324 of the processor 300. The fetch unit 324 then forwards the instruction to an instruction decoder 330. The instruction decoder 330 reads the operation class code from the instruction and uses it to extract the execution control information representing a single execution flow for the associated class of similar operations from a microcode sequencer 336 (e.g., a microcode memory, PLA, hardwired logic, and/or other type logic). The instruction decoder 330 also selects an execution unit 360*i* from a bank of execution units 360A–360X which will receive the execution control information and the operands. While the processor 300 has been shown to contain only certain circuitry, it is understood that the processor 300 typically contains additional circuitry.

The operation selector code identified by the operation selector code descriptor is passed to the execution unit. There, the operation selector code is combined with the execution control information, thus augmenting the single execution flow, and causing the execution unit to perform a specific operation from the class of similar operations represented by the operation class code.

Finally, the execution unit produces a result value 375 which is then stored into a register file 370. In other embodiments, the result can be stored in memory, or any other well known location.

From this perspective, it is understood that the operation selector code embodies those execution specific aspects of an operation which need not be processed by prior elements of the execution pipeline. By decoupling the execution specific aspects for a class of operations from the execution flow for those operations, a generic execution flow is created, thus resulting in a more efficient decoder and execution pipeline while retaining the ability to configure an execution unit to produce an efficient result.

By way of example, FIGS. 4A–B are block diagrams illustrating other exemplary instruction formats according to embodiments of the invention.

FIG. 4A shows an instruction format 410 which includes five fields: 1) an operation class code field 412, 2) an first operand field 414, 3) an second operand field 416, 4) an operation selector code field 418, 5) and a prefix/extension field 413. The prefix/extension field may be used for pipelining, memory segment selection, or some other function, and thus demonstrates that the invention is not restricted to only the specified fields, but rather, the instruction format may include other fields beyond the operation class code field, operand field(s), and operator selector code field.

It should also be understood that not all operations use two operands. It is possible for a class of operations to use one operand or several. FIG. 4B shows an instruction format 430 which includes three fields: 1) the operation class code field 432, 2) a single operand field 434, 3) and the operator selector code field 438. Of course, additional fields (e.g. an extension field) could be added to the instruction format.

FIG. 5A is a block diagram illustrating how the data elements of an instruction ultimately arrive at an execution unit according to one embodiment of the present invention. FIG. 5A is an expanded exemplary view of the execution unit 360*i* shown in FIG. 3. In FIG. 5A, the execution unit circuitry is shown as a exemplary pipeline of pre-operation circuitry 562, operation circuitry 564, and post-operation circuitry 566. Execution control information for a single execution flow arriving from the decoder sets up the execution circuitry. One or more operands enter the execution unit and cascade from the pre-operation circuitry to the post operation circuitry where the completed operation creates a result value. The operation selector code can alter the execution flow at various points in the cascade so that the execution unit can produce the requested operation on the operands.

By way of example, FIG. 5B is a block diagram illustrating the operation selector code controlling the execution flow of a compare (CMP) operation according to one embodiment of the present invention. More specifically, FIG. 5B shows how the operation selector code can control both the pre-execution circuitry and the post-execution circuitry.

One skilled in the art will appreciate that each comparison relationship has one or more synonymous relationships. For example, a relationship phrased as "A is-greater-than B" might also be phrased as "A is-not-less-than-or-equal-to B" or "B is-less-than A." Thus, a compare-greater-or-equal relationship can also be performed by reversing the operands and using a compare-less-than relationship. Using this method, some comparison operations can be further collapsed in a single execution flow running in an execution unit.

In the embodiment depicted in FIG. 5B, the execution unit 360$i$ performs calculations on 8-bit values, and in this case is executing an instruction implementing the comparison for the source code statement:

If (A>=B){}; //if A is greater-or-equal to B, do nothing.

The execution unit receives the execution control information for the class of compare operations 510, the operation selector code for the compare-greater-or-equal relationship 505, the first operand 515, and the second operand 520. The first operand (A) is an 8-bit value set to binary 15. The second operand is an 8-bit value set to binary 27.

As described above, the compare-greater-or-equal relationship can also be performed by reversing the operands and using a compare-less-than relationship. One method for determine a compare-less-then relationship is to subtract the first value from the second value and examine the result. If the result is a positive number then the first value was the lesser of the two. If the result is negative, then the first value was greater than the second. Thus, in the example shown in FIG. 5B, the operator selector code causes the pre-execution circuitry 562 to switch the two operands before supplying them to the operation circuitry 564. Because the operands have been switched, the operation circuitry 564 ends up subtracting the second operand from the first operand in the to obtain an intermediate result. Next, the operation selector code causes the post-operation circuitry 566 to interpret the intermediate value into a result value. In this embodiment, the logical value of "TRUE" is represented by setting all bits of the result to "1" (i.e. "11111111") and a logical value of "FALSE" is represented by binary zero (i.e. "00000000"). Thus, the post-operation circuitry would examine the intermediate value and set the result value to "00000000" which, in this processor, indicates that the relationship is "FALSE". Naturally, in computer architectures which use other values to indicate "FALSE", the post-operation circuitry can be altered by the operation selector code to output the appropriate value.

While this example is presented using 8-bit values so that the invention may be clearly understood, one skilled in the art will recognize that this technique applies to execution units using operands of any size and/or on packed data operands (floating point or integer).

Thus, the invention can be used to implement a processor that supports any number of comparison relationships using a single opcode (and therefore, a single entry in the opcode map) and still output the all or nothing mask type result shown in the left side of Table 1. As a result, the use of costly conditional branches is avoided because the mask type output of these comparison relationships can be used in the manner described with reference to the left side of Table 1. In addition, since only a single opcode is required, the increased complexity due to having a separate opcode for every comparison relationship is avoided.

In another embodiment, the invention performs a class of bit shift (SHIFT) operations. Typical SHIFT operations include straight shifts (i.e. bits at one end of the operand are lost while bits at the other end are zero-filled) and circular shifts (i.e. bits falling off one end are transferred to the other.) SHIFT operations may be of fixed length (e.g. shift-byte) or arbitrary length (e.g. 3 bits), and also have a directional component (e.g. left or right).

FIG. 5C is a block diagram illustrating the operation selector code controlling the execution flow of a SHIFT operation according to one embodiment of the present invention. More specifically, the actual operation stage of the execution flow is modified as opposed to a pre-operation or post-operation stage.

By way of example in FIG. 5C, the execution control information 525 represents the single execution flow for a class of shift operations while the operation selector code 530 specifies a "logical-shift-right" of four bits. The execution unit 360$x$ receives the execution control information, the operation selector code, and the operand 535 which is set to binary "01101001". In this instance, the operation selector code alters the operation circuitry 564 so that the operand shifts to the right by four bits. Since it is a logical shift, the rightmost four bits are zero-filled. The result value from the four bit, logical right shift is "00000110". In alternate embodiments, the operator selector code can specify circular shifts and/or other parameters which are applicable to shift operations as a class.

Each of the above examples demonstrates how the invention overcomes the deficiencies of the prior art, thus allowing for a more efficient execution stream while preserving precious opcode space in the decoder. By combining a class of operations into a single execution flow which can be controlled in the execution unit, less opcodes are needed for a given set of operations. Since the execution flow can be controlled in the execution unit, it is possible to output discrete values of "TRUE" or "FALSE (i.e. " 11111111" or "00000000") which can be used as masks to subsequent operations, thus allowing for a more efficient execution stream by avoiding troublesome branch instructions in some instances.

While FIG. 5A shows the operator selector code being received by the various stages of the execution unit circuitry, alternative embodiments of the execution unit may not have each of these circuits and/or may not provide the operation selector code to each of the circuits. In addition, it will be noted that the specific arrangements and methods described herein are illustrative of the principles of the invention. Numerous modifications may be made without departing from the spirit and scope of the invention. Although the invention has been shown in the form of particular embodiments, it is limited only by the scope of the appended claims.

What is claimed:
1. A processor comprising:
   a fetch unit to receive an instruction format, said instruction format including an operation class code field to store an operation class code that identifies a plurality of similar operations, a first operand field to store a first operand descriptor that identifies a first operand, and an operation selector code field to store an operation selector code descriptor that identifies an operation selector code that specifies one of said plurality of similar operations;

a decoder, coupled to said fetch unit, to generate a single execution flow for said plurality of similar operations responsive to the data in said operation class code field; and an execution unit, coupled to said decoder and coupled to receive said operation selector code, to execute one of said plurality of similar operations on said first operand using said single execution flow and said operation selector code.

2. The processor of claim 1, wherein said first operand includes a plurality of data elements.

3. The processor of claim 1, wherein said operation class code identifies a class of shift operations on said first operand.

4. The processor of claim 3, wherein said operation selector code identifies which direction to shift.

5. The processor of claim 1, wherein said instruction format further includes a second operand field to store a second operand descriptor that identifies a second operand.

6. The processor of claim 5, wherein said operation class code identifies a plurality of comparison operations that each compares at least two corresponding data elements in said first and second operands.

7. The processor of claim 1, wherein said operation selector code alters a pre-operation stage of said execution flow to perform said one of said plurality of similar operations.

8. The processor of claim 1, wherein said operation selector code alters an operation stage of said execution flow to perform said one of said plurality of similar operations.

9. The processor of claim 1, wherein said operation selector code alters a post-operation stage of said execution flow to perform said one of said plurality of similar operations.

10. A method of executing instructions, said method comprising:

receiving an instruction which includes an operation class code that identifies a class of similar operations, a first operand descriptor that identifies a first operand, and an operation selector code descriptor that identifies an operation selector code, said operation selector code specifying one of said class of similar operations as a currently selected operation;

decoding said operation class code into execution control information for the class of said similar operations;

providing said execution control information and said operand to an execution unit;

passing said operation selector code through to said execution unit; and executing on said first operand said currently selected operation specified by said operation selector code using said execution control information.

11. The method of claim 10, wherein said operation class code identifies a class of shift operations on said first operand.

12. The method of claim 10, wherein said operation selector code identifies which direction to shift.

13. The method of claim 10, wherein:

said instruction further includes a second operand descriptor that identifies a second operand;

said providing also includes providing said second operand to the execution unit; and said executing also includes executing said currently selected operation on said second operand.

14. The method of claim 13, wherein said first operand and said second operand include a plurality of data elements.

15. The method of claim 13, wherein said operation class code identifies a plurality of comparison operations that each compares at least two corresponding data elements in said first and second operands.

16. The method of claim 10, wherein said operation selector code alters a pre-operation stage of said execution flow to perform said one of said plurality of similar operations.

17. The method of claim 10, wherein said operation selector code alters an operation stage of said execution flow to perform said one of said plurality of similar operations.

18. The method of claim 10, wherein said operation selector code alters a post-operation stage of said execution flow to perform said one of said plurality of similar operations.

19. A method of executing an instruction, said method comprising:

receiving an instruction which includes an operation class code that specifies a plurality of comparison relationships, a first operand descriptor that identifies a first operand, a second operand descriptor that identifies a second operand, and an operation selector code descriptor that identifies an operation selector code specifying one of said plurality of comparison relationships;

decoding said operation class code into execution control information for said plurality of comparison relationships;

providing said execution control information and said first and second operands to an execution unit;

passing said operation selector code through to the execution unit;

said execution unit, subtracting said second operand from said first operand to generate data indicative of said plurality of comparison relationships; and storing only a result of the one of said plurality of comparison relationships specified by said operation selector code, wherein each data element of said result is stored as a binary value of all ones or zeroes.

20. The method of claim 19, wherein said operation selector code alters a pre-operation stage of said execution flow to perform said one of said plurality of comparison relationships.

21. The method of claim 19, wherein said operation selector code alters an operation stage of said execution flow.

* * * * *